United States Patent
Muse et al.

[11] Patent Number: 6,134,081
[45] Date of Patent: Oct. 17, 2000

[54] MEDIA HUB MOUNTING SYSTEM FOR MINIMIZING Z-AXIS DURING CARTRIDGE INSERTION AND EJECTION TRANSLATION

[75] Inventors: Jay A. Muse, Centerville; Brian Schick, Eden, both of Utah

[73] Assignee: Iomega Corporation, Roy, Utah

[21] Appl. No.: 08/920,932

[22] Filed: Aug. 29, 1997

[51] Int. Cl.[7] .................... G11B 23/033; G11B 17/028
[52] U.S. Cl. .................................. 360/133; 360/99.05
[58] Field of Search ............................ 360/133, 99.05, 360/99.12; 369/291, 270, 271

[56] References Cited

U.S. PATENT DOCUMENTS

| | | | |
|---|---|---|---|
| 4,517,617 | 5/1985 | Tsuji et al. | 360/133 |
| 4,523,246 | 6/1985 | Okuzawa | 360/133 |
| 4,772,971 | 9/1988 | Tokuda | 360/99.12 |
| 4,821,124 | 4/1989 | Tamaru | 360/133 |
| 5,115,366 | 5/1992 | Oishi | 360/133 |
| 5,453,898 | 9/1995 | Mizuta et al. | 360/133 |
| 5,481,420 | 1/1996 | Cardona et al. | 360/133 |
| 5,535,081 | 7/1996 | Nelson et al. | 360/133 |
| 5,724,216 | 3/1998 | Iftikar et al. | 360/133 |
| 5,793,584 | 8/1998 | Knight et al. | 360/133 |

FOREIGN PATENT DOCUMENTS

| | | |
|---|---|---|
| 0 335 465 A2 | 10/1989 | European Pat. Off. . |
| 0 788 103 A2 | 8/1997 | European Pat. Off. . |
| 91 01 156 | 6/1991 | Germany . |
| 63-086172 | 4/1988 | Japan ............ 360/133 |
| 2 161 977 | 1/1986 | United Kingdom . |

*Primary Examiner*—Craig A. Renner
*Attorney, Agent, or Firm*—Woodcock Washburn Kurtz Mackiewicz & Norris LLP

[57] ABSTRACT

A system is for mounting a removable media disk cartridge in a disk drive without translating the cartridge or spindle motor in a Z-axis relative to each other The system comprises a spindle in the drive having a substantially planar top surface with an annular groove disposed and an datum ring disposed thereon. The annular groove accepts an inner ring surface of a media disk hub. The disk cartridge has a hub with an inner ring that engages the annular groove in the spindle. Additionally the hub has an outer peripheral edge that has an angled surface. During disengagement of the hub from the spindle, the hub is tilted when the cartridge shell engages the outer peripheral edge. The datum ring acts as a fulcrum while the inner ring is tilted out of the annular groove.

63 Claims, 11 Drawing Sheets

MEDIA HUB MOUNTING SYSTEM FOR MINIMIZING Z-AXIS DURING CARTRIDGE INSERTION AND EJECTION TRANSLATION

BACKGROUND OF THE INVENTION

This invention relates to cartridge based data storage systems. More particularly, the invention relates to the engagement and disengagement of a disk cartridge to from a disk drive motor.

Cartridge based tape and disk data storage devices for storing digital electronic information have been in use in the computer industry for several decades. Removable disk cartridges typically comprise an outer casing or shell that houses a disk-shaped magnetic, magneto-optical or optical storage medium upon which information can be stored. The cartridge shell often comprises upper and lower halves that are formed of injection molded plastic and are joined together to house the disk. Magnetic disk media can be either rigid or flexible and are mounted on a hub that rotates freely within the cartridge. When the cartridge is inserted into a disk drive, a spindle motor in the drive engages the disk hub in order to rotate the disk within the cartridge at a given speed. The outer shell of the cartridge typically has a media access opening proximate one edge to provide the recording heads of the drive with access to the disk. A shutter or door mechanism is provided to cover the head access opening when the cartridge is not in use to prevent dust or other contaminants from entering the cartridge and settling on the recording surface of the disk. The shutter is commonly biased to a closed position with a spring bias. To open the shutter and gain access to the media, the drive employs a mechanism that overcomes the bias of the spring.

Such a cartridge is disclosed in U.S. Pat. No. 4,517,617 (Tsuji). The Tsuji patent is generally directed to a disk cartridge that contains a flexible magnetic disk having a center core (i.e., a hub) and an apparatus for reading and recording information on the flexible magnetic disk. The disk cartridge comprises a flexible disk attached to a hub. The disk and hub assembly are sandwiched between an upper cover and a lower cover. To constrain the movement of the flexible disk within the cover, the hub has a center hollow which mates with a projection from the upper cover of the cassette. The shutter moves laterally across the faces of the disk cartridge exposing or covering a disk access opening.

Disk drives for use with such removable disk cartridges typically employ either a linear actuator mechanism or a radial arm actuator mechanism for positioning the read/write head(s) of the disk drive on the recording surface(s) of the storage medium, or disk. Because the disk cartridges are designed to be removable from the drive, the linear or radial arm actuators must be able to move off, and away from, the storage medium to a retracted position in order to prevent damage to the head(s) when a cartridge is inserted and removed from the disk drive. Moreover, many removable cartridge disk drives employ a pair of opposing read/write heads for recording and reproducing information on both sides of a storage medium. Typically, the opposing heads are disposed on flexible suspension arms at the distal end of an actuator that allow the heads to fly closely over the respective surfaces of the rotating disk. The opposing heads must be spread apart as they approach the edge of the disk during a head loading operation in order to avoid collision with the edge of the disk. Similarly, when the heads are unloaded from the disk, they must again be spread apart to avoid collision with the edge of the disk and each other.

When a disk cassette of the type described above is inserted into the disk drive, the hub of the disk and the spindle of the drive must engage to allow the drive to spin the disk at a required rate. Typically, the hub and spindle engagement is accomplished by either translating the cartridge above the spindle until the spindle aligns with the cartridge, then translating the cartridge downwardly until the hub and spindle engage. Alternatively, the spindle is lowered before the disk cartridge is inserted into the drive. After the disk cassette is fully inserted, or during insertion, the spindle is raised to engage the hub.

In applications having very little space to accommodate a storage device, such as hand-held computers, digital cameras, and the like, the above-described disk and drive arrangements present a variety of drawbacks. For example, raising the disk cassette above the spindle requires additional overhead space to allow the cartridge to move above the spindle. Where the spindle is lowered, additional space is required to accommodate the spindle and motor as they move down into the drive chassis. In either case, a thicker disk drive results. To reduce the overall dimensions of the drive and disk cassette, drawbacks of the prior art disk cassettes and removable media drives must be overcome.

SUMMARY OF THE INVENTION

The present invention is directed to a data storage device that comprises a disk drive and removable cartridge. The drive comprises a spindle having a substantially planar top surface. An annular groove disposed in the top surface of the spindle. The top surface is adapted to accept a ring surface of a media disk hub. The top surface also comprises an annular datum ring that operates as a fulcrum point to tilt the media disk hub during hub disengagement from the spindle.

The cartridge for use with the drive comprises an outer shell having a spindle access opening, a substantially circular magnetic medium rotatably disposed within the outer shell, and a hub connected to the magnetic medium proximate the center of the medium. The hub has an outer peripheral edge for selectively engaging an edge of the spindle access opening such that the hub decouples from the spindle when said cartridge ejects from said disk drive without translating the spindle or the outer shell relative to each other in a vertical direction. The hub further comprises a center bore and the cartridge further comprises a pin projecting down from a top of said outer shell and into said center bore. The pin selectively impinges upon the center bore enabling a decoupling of the hub from said spindle. Additionally, the spindle access opening comprises a rounded edge adapted to selectively engage the edge of the hub and there by lift the ring out of the spindle groove.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENT

The present invention provides a data storage cartridge for use with a removable media type of disk drive. Throughout the description, a preferred embodiment of the invention is described in connection with a particular sized and shaped disk cartridge. However, the disk cartridge dimensions and shape are presented for exemplary purposes only. For example, it is not necessary that the hub engagement/disengagement mechanism is used with a cartridge of any particular size or shape; however, the particular disk drive and cartridge shown are provided to illustrate the operation of the minimal z-axis translation of the hub and spindle arrangement. Accordingly, the mechanism should not be limited to the particular cartridge embodiment shown as the invention contemplates the application to other cartridge and drive types and configurations.

Figure 1:
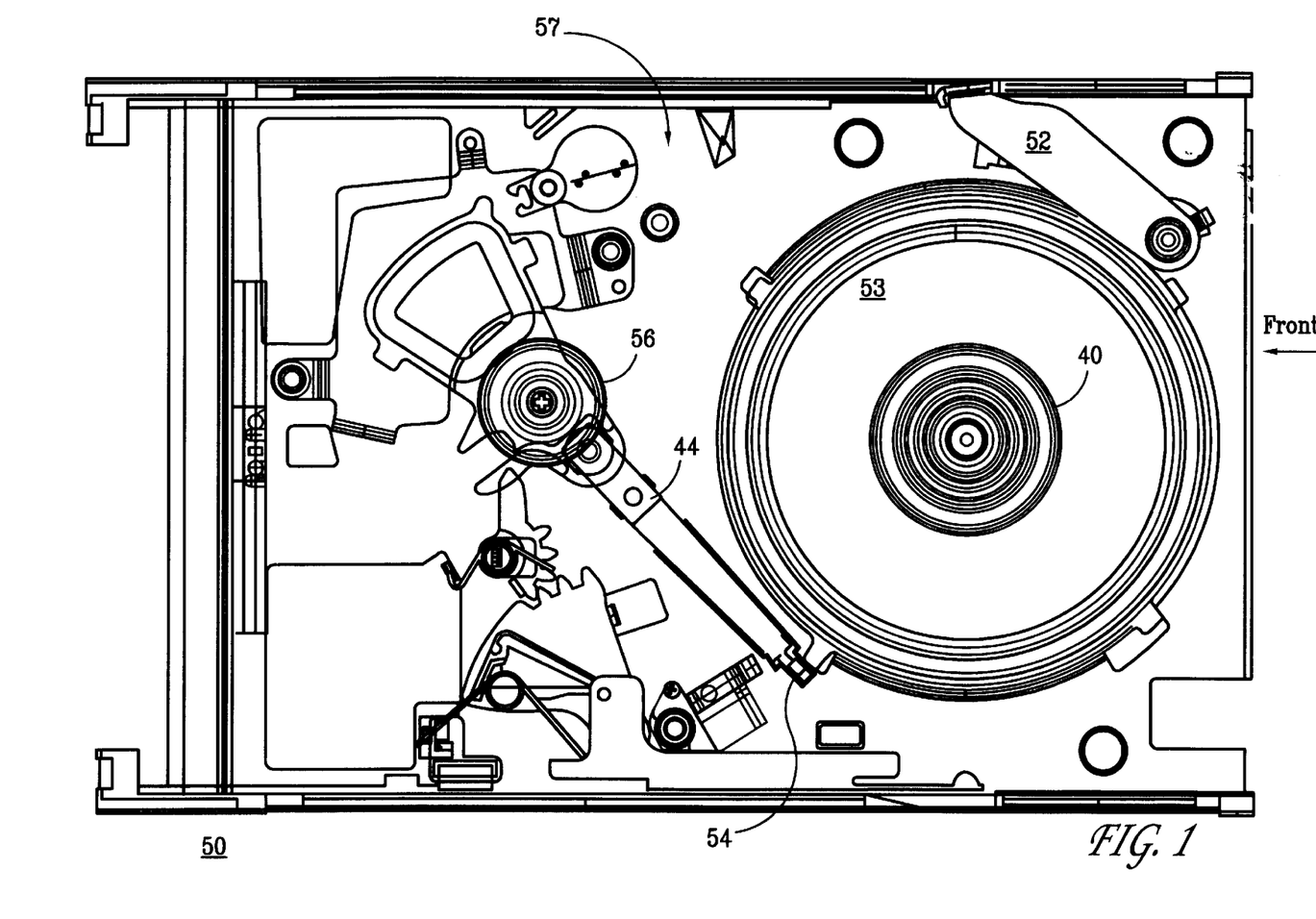
FIG. 1 is a top plan view of a disk drive according to the present invention.

FIG. 1 is a top view of a disk drive 50 with its top cover removed and the components moved from there relative operational positions for clarity. Drive 50 comprises a chassis 57, an actuator 56 (preferably a rotary actuator), including an opposing pair of load beams 44 having a read/write head 54 disposed at the end of each load beam, a spindle motor 53 and a spindle 40, and a shutter opening arm 52. The operation of disk mounting to spindle 40 is described more fully below. A disk cartridge can be inserted into the front of the drive in the direction indicated by the arrow. During insertion, the cartridge slides linearly along the top surface of chassis 57 and spindle motor 53 for engagement with the read/write heads 46.

Figure 2A:
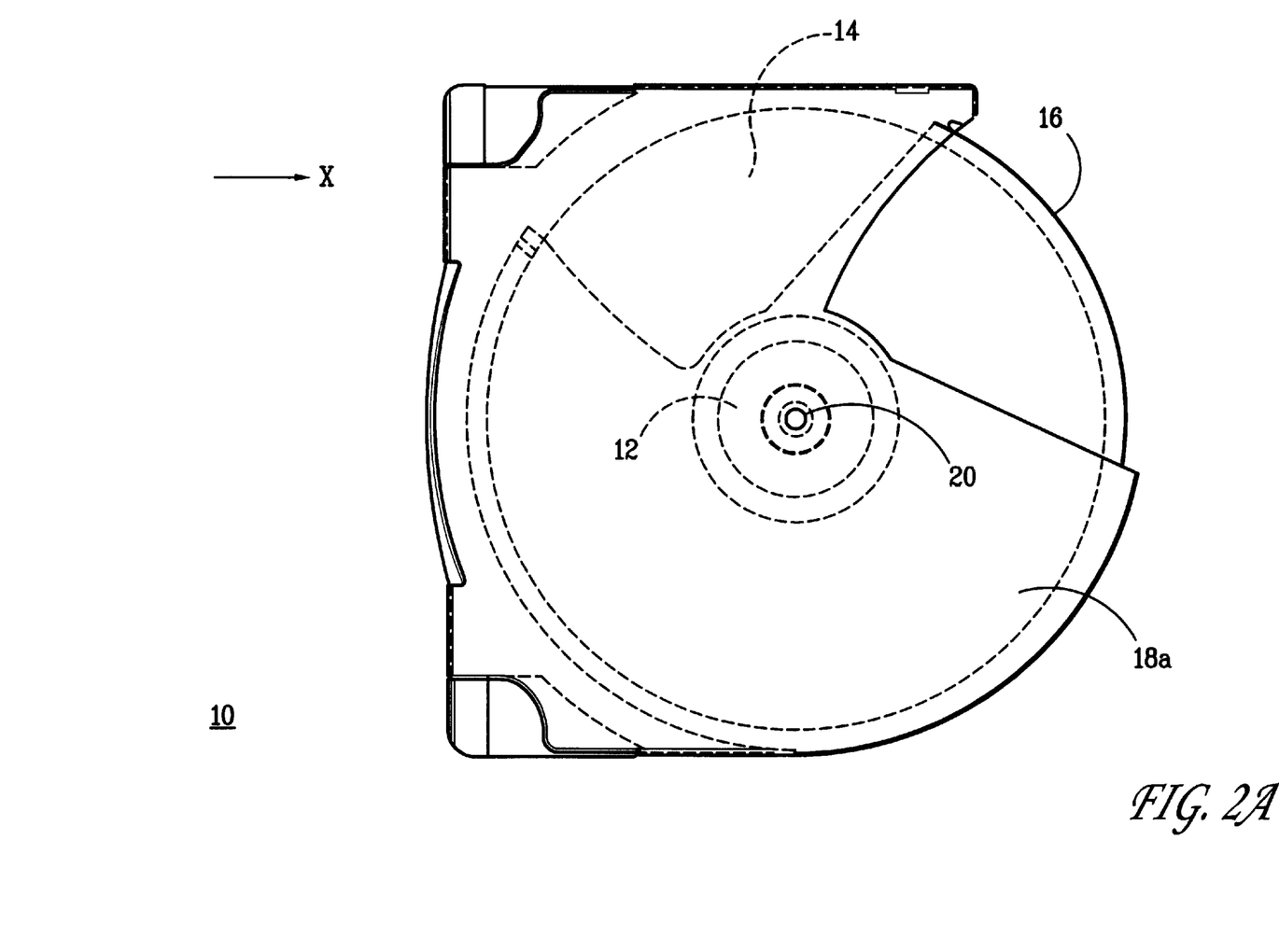
FIG. 2A is a top view of an exemplary cartridge for use with the present invention.
Figure 2B:
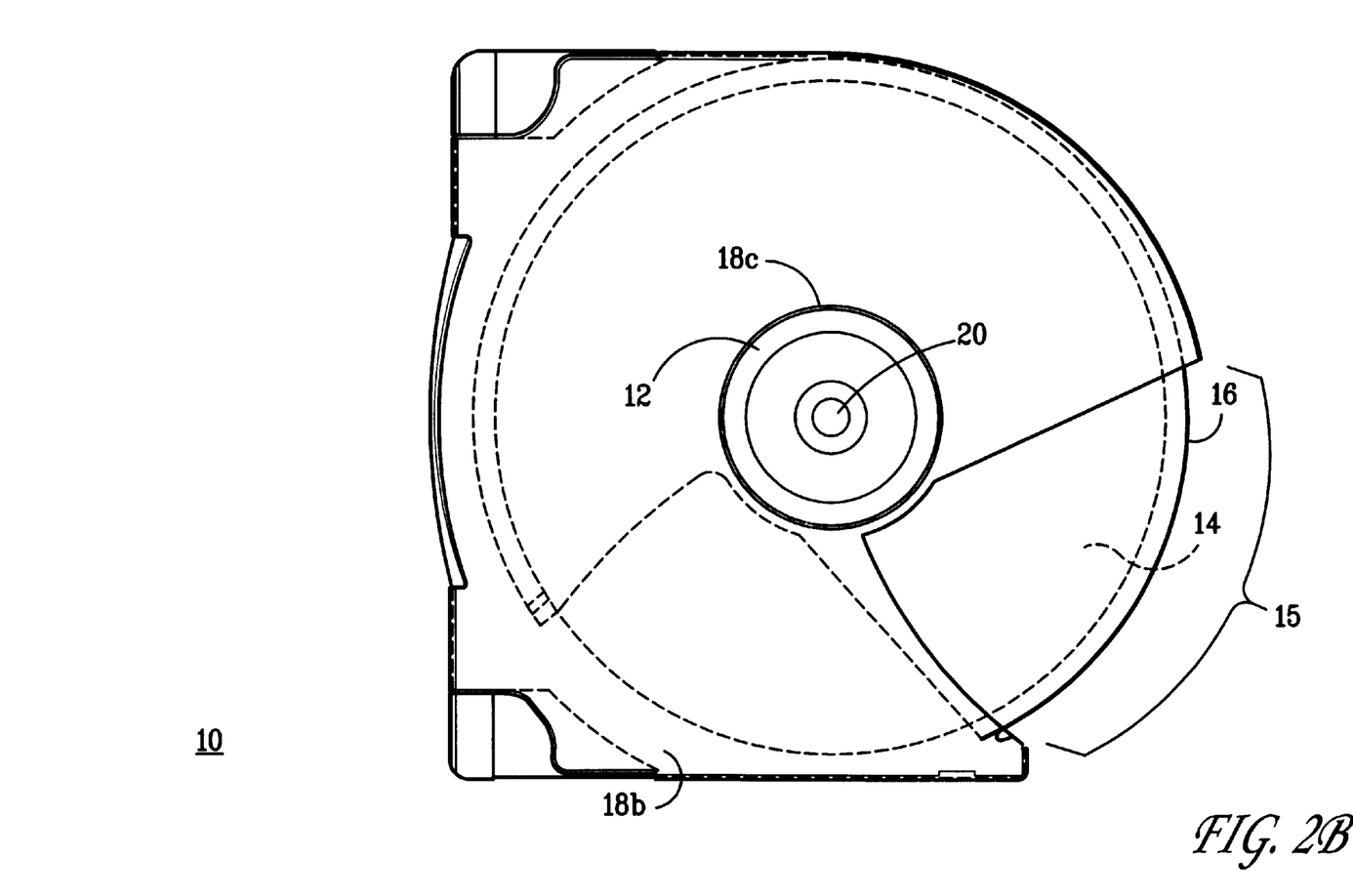
FIG. 2B is a bottom view of an exemplary cartridge for use with the present invention.

FIGS. 2A and 2B present top and bottom views of a disk cartridge, respectively, that embodies aspects of the present invention. The disk cartridge comprises a flexible magnetic disk 14, a disk media hub 12, top and bottom cartridge shell halves 18a and 18b, a rotary shutter 16, and a shutter pivot pin 20. Shutter 16 rotates within cartridge 10 between an open position and a closed position. In the open position, shutter 16 is rotated away from a generally wedge shaped disk access opening 15 that is formed in cartridge shell 18, exposing the top and bottom surfaces of disk 14 for access by a read/write head or heads contained within a disk drive. In the closed position, shutter 16 is rotated over disk access opening 15, sealing disk cartridge 10 and protecting disk 14. The flexible magnetic disk 14 is formed of a thin polymer film, such as MYLAR, and has a thin magnetic layer uniformly dispersed on the top and bottom surfaces. The magnetic surfaces magnetically sensitize the flexible disk 14 and enable the storage of digital data when the surface is brought into magnetic communication with a magnetic transducer of the type commonly found in disk drives. Disk 14 is generally circular with a circular hole proximate the center of disk 14.

Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shell halves 18a, 18b. Lower cartridge shell half 18b has a substantially circular spindle access opening 18d such that a disk drive can provide rotational power to disk 14 via hub 12. Preferably, said access opening presents a rounded edge.

Figure 2C:
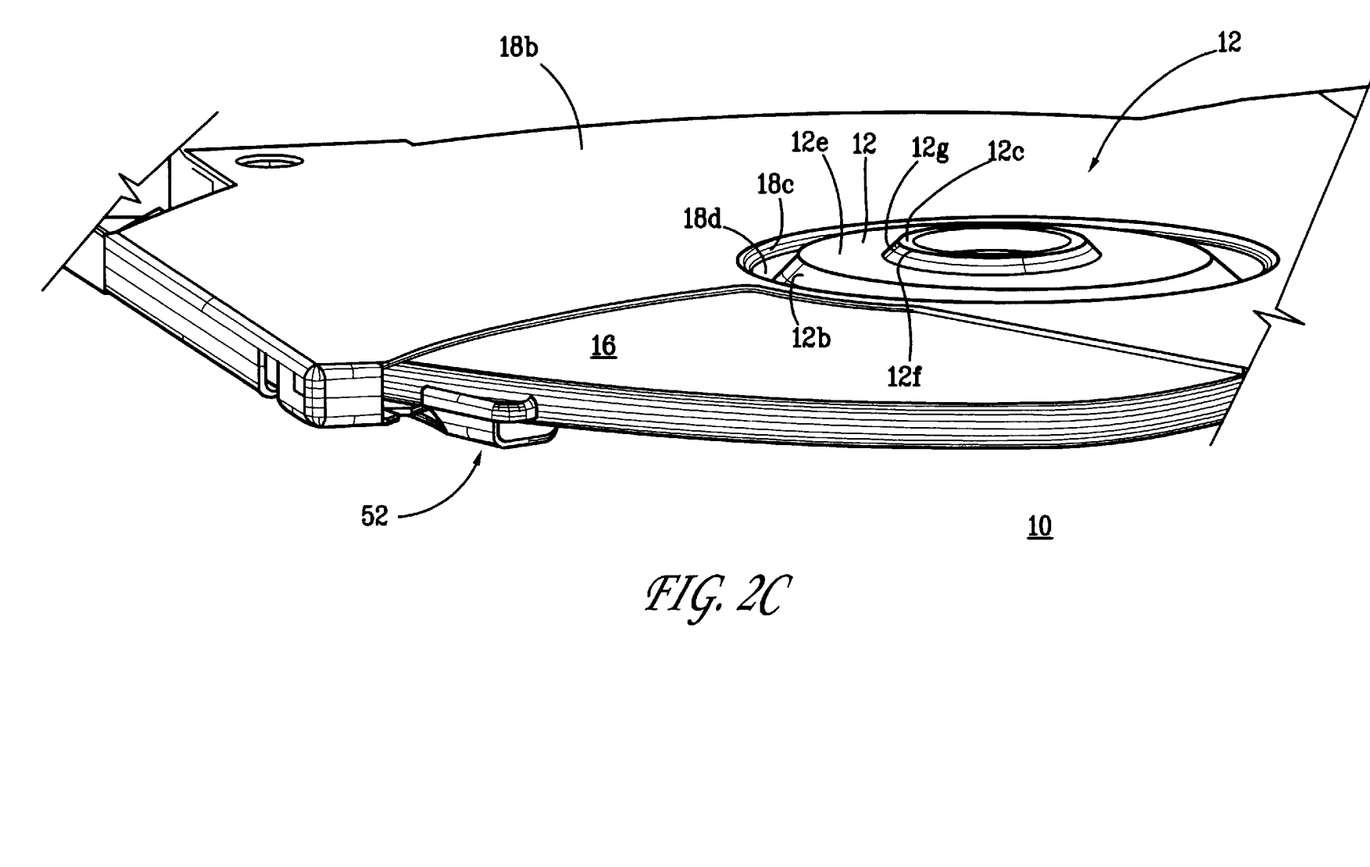
FIG. 2C is an isometric view of the underside of the cartridge of the present invention.

FIG. 2C shows an isometric view of the underside of cartridge 10. Hub 12 is disposed in spindle access hole 18d of cartridge 10. Hub 12 comprises a substantially flat bottom surface 12e, and an inner ring 12c, and outer peripheral edge 12b. Inner ring has an outer angled edge 12g and a substantially flat bottom surface 12f. Moreover, outer peripheral edge 12b is also angled. Also shown in FIG. 2C, bottom shell half 18b has a rounded edge 18c around spindle access hole 18d. As described in further detail below, hub 12 and rounded edge 18c interact during dismounting of hub 12 from spindle 40 (shown in FIG. 1).

Figure 3A:
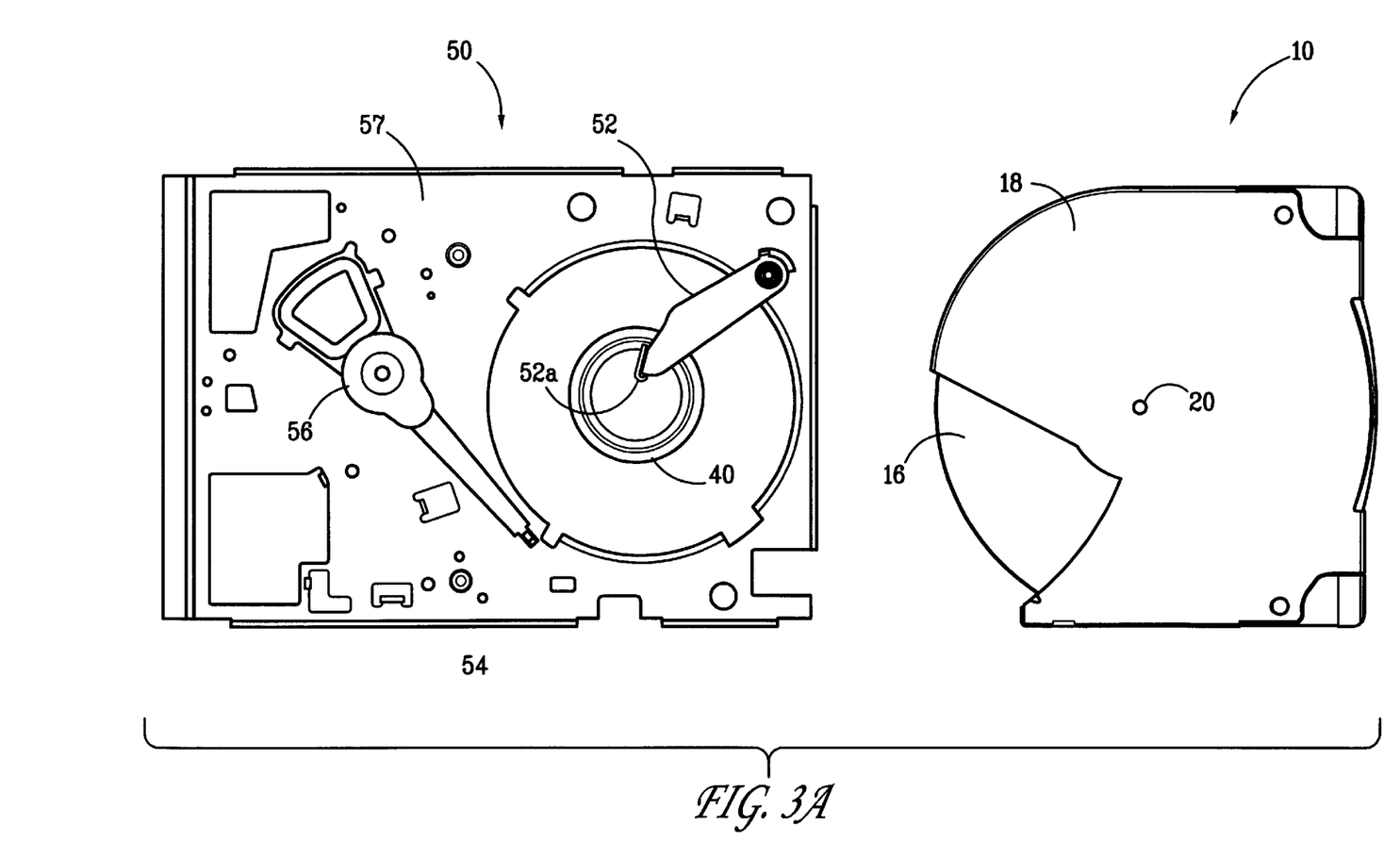
FIGS. 3A–3C show the cartridge of FIGS. 1 and 2 in various stages of insertion into a disk drive in accordance with the present invention.
Figure 3B:
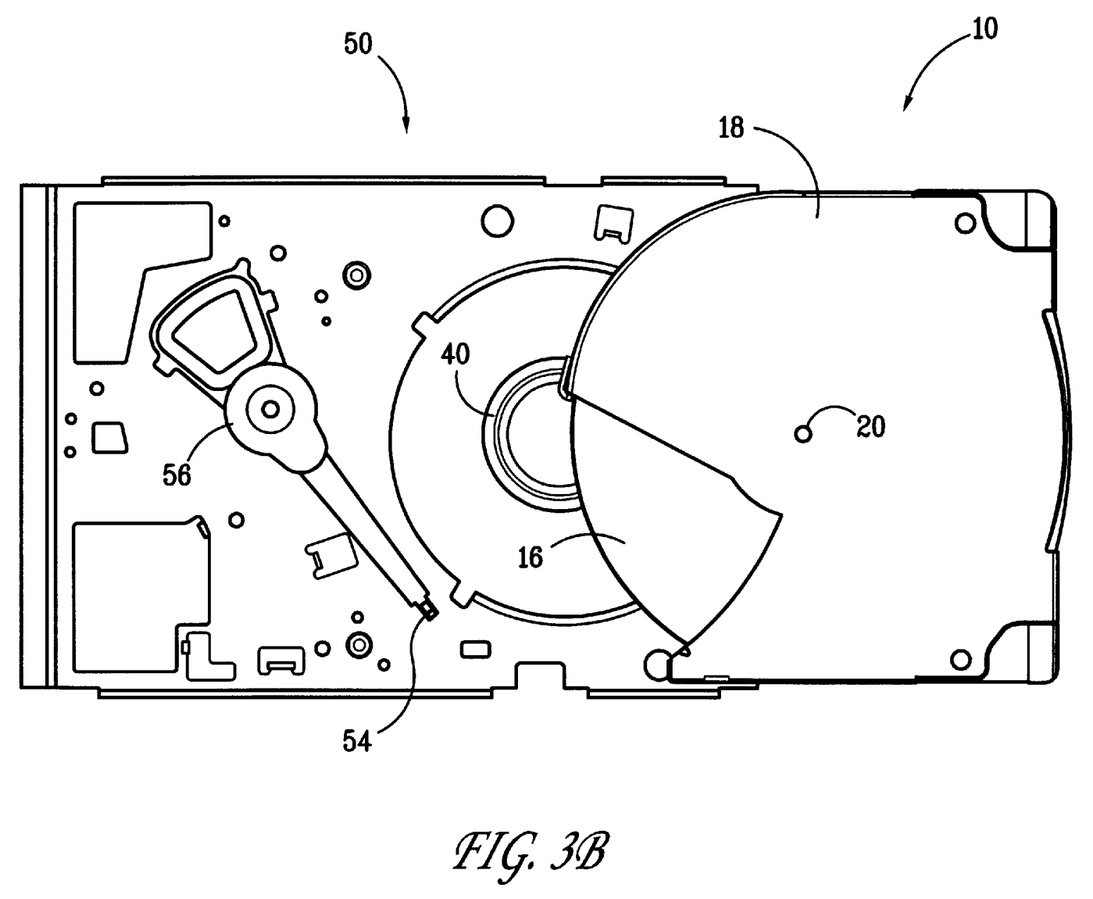
Figure 3C:
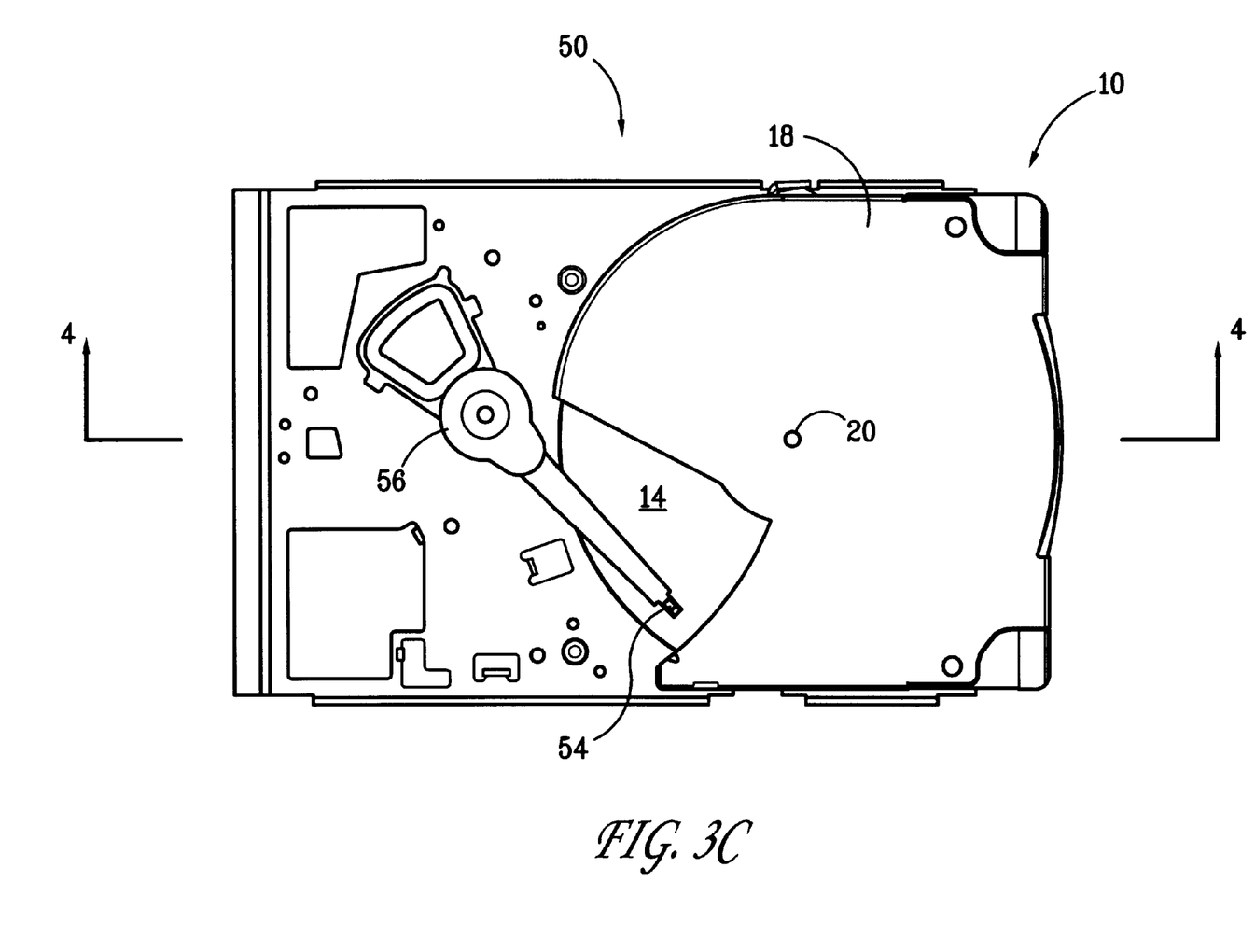

Referring now to FIGS. 3A–3C, in conjunction with FIGS. 2A–2C, the operation of cartridge 10 in conjunction with a disk drive 50 is illustrated. Drive 50 comprises a chassis 57, a spindle 40 controlled by a drive motor (not shown), an actuator 56 having a pair of read/write heads 54 disposed on the ends of opposing arms, and a shutter operating arm 52. Actuator 56 is depicted as a radial actuator disposed proximate the back end of chassis 57. Spindle 40 is disposed on chassis 57 proximate the front portion. And, shutter operating arm 52 is disposed proximate one side and proximate a front edge of chassis 57. Shutter operating arm 52 comprises a finger 52a adapted to engage shutter 16 and rotate it toward the open position during cartridge insertion. Spring tension is supplied to shutter 16 from within cartridge 10 to rotate shutter 16 back to the closed position during ejection of cartridge 10 from drive 50. A disk drive insertion and ejection mechanism is described in further detail in co-pending patent application Ser. No. 08/920,935. entitled "CARTRIDGE LOAD AND EJECT MECHANISM FOR A REMOVABLE CARTRIDGE DRIVE" filed Aug. 29, 1997, which is hereby incorporated by reference in its entirety. Cartridge 10 is inserted into the front of drive 50. During insertion of cartridge 10 into drive 50, hub 12 slides along the top surface of spindle motor 53 and over spindle 40. As described more fully below, surface 12c provides a sliding surface for hub 12.

Figure 4A:
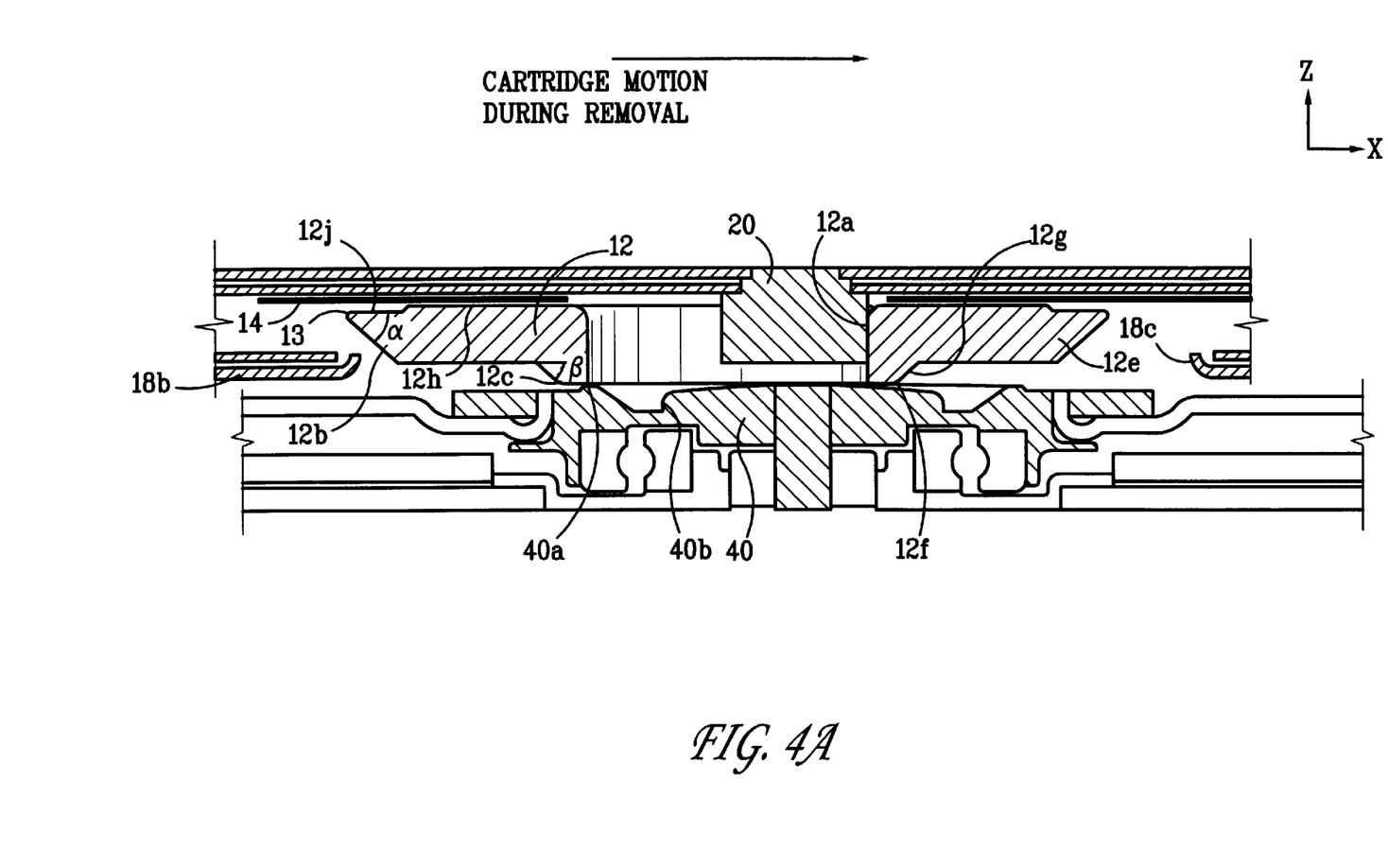
FIG. 4A–4D show a cut-away side view corresponding to line IV—IV of FIG. 3C, wherein the media hub is in various stages of engagement and disengagement from the drive spindle motor.
Figure 4B:
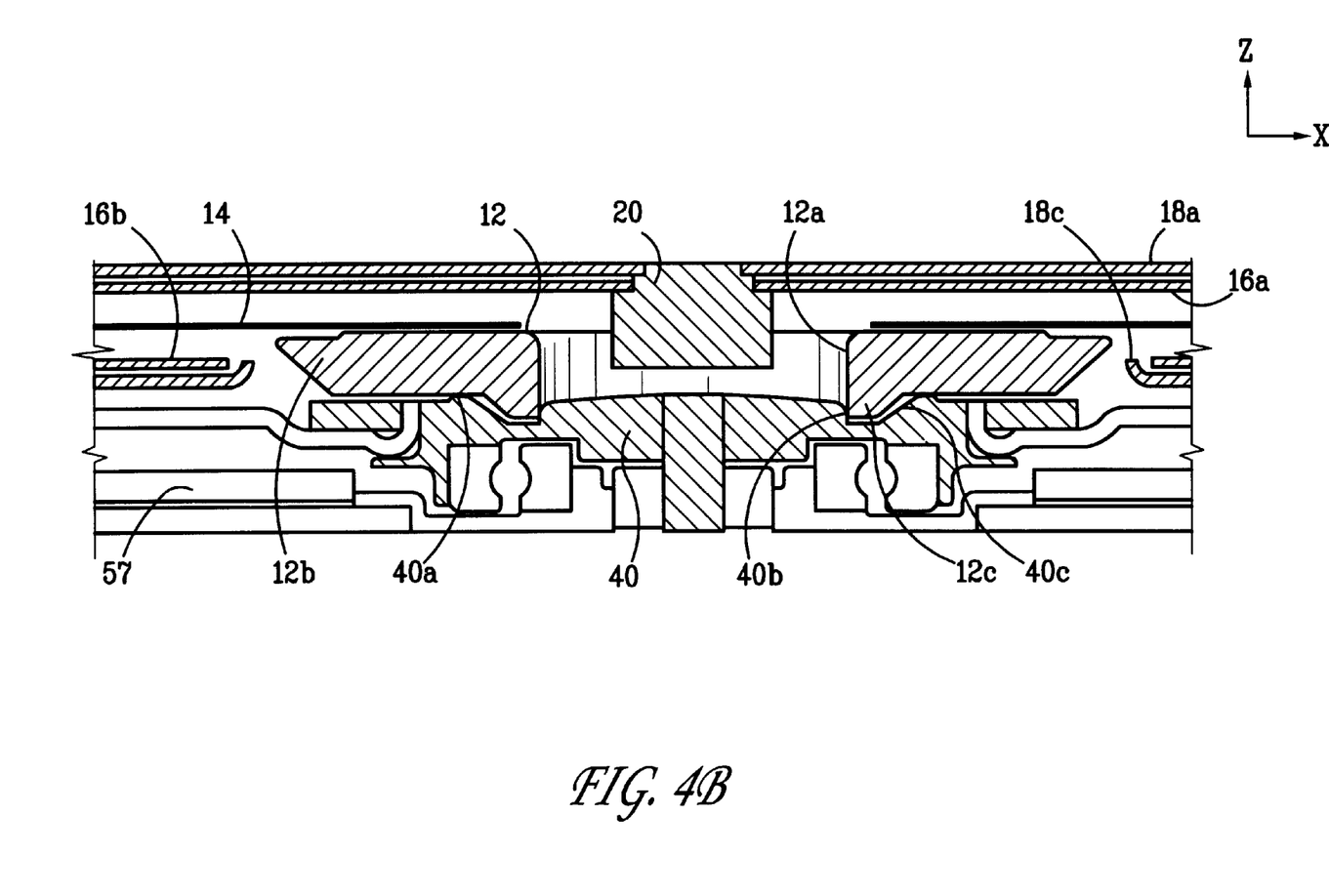
Figure 4C:
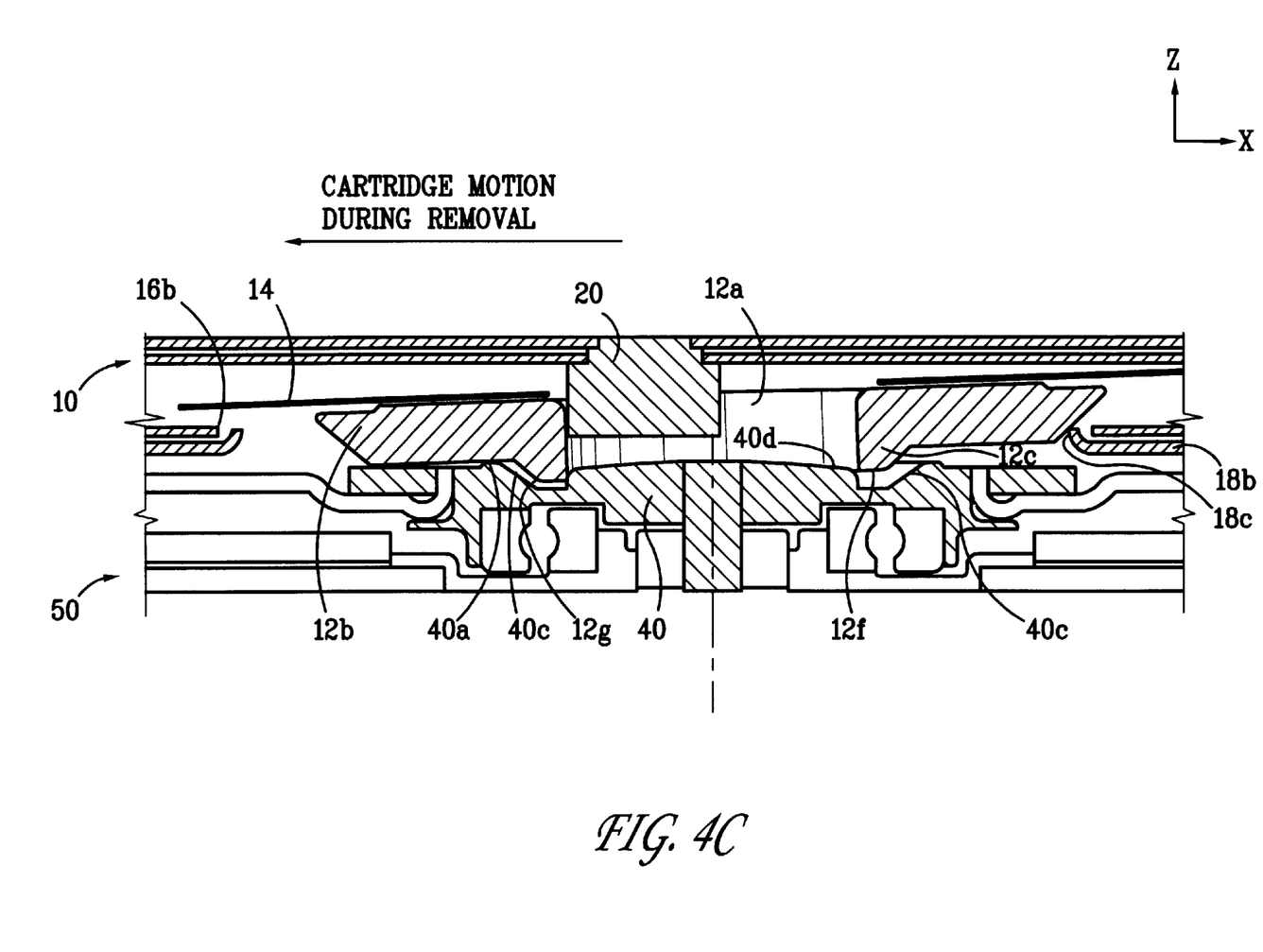

Referring to FIGS. 4A–4C, a cut-away side view of cartridge 10 and drive 50 along line IV—IV in FIG. 3C illustrate the operation of engagement and disengagement of media hub 12 from spindle motor 40. Media hub 12 is formed of a ferrous material such as steel, preferably stainless steel, and is essentially disk shaped. Moreover, the surface finish on hub 12 is about 8 micro inches to reduce friction. Hub 12 comprises a bore 12a proximate the center of hub 12, peripheral outer edge 12b and inner ring surface 12c. Peripheral edge 12b preferably forms angled outer surface that is adapted to engage with a rounded edge of the spindle access opening 18d during upward translation into shell 18. The preferred angle a for the outer edge is about 45 degrees. More preferably peripheral outer edge 12b substantially forms a ring around the circumference of hub 12. However, other configurations could accomplish a similar function, such as spoke-like or fingers of angled surfaces rather than a solid annular surface depicted in the figure. Similarly, inner ring surface 12c, preferably substantially ring shaped, could also comprises a different form, for example a series of fingers. Inner ring surface 12c also has a preferred angle, β, of about 45 degrees.

As shown by the cut-away side views, hub 12 has a stepped side profile. Disk 14 is attached to the hub along a topmost surface 12h of hub 12. A step down from top surface 12h is a surface 12j, which forms the top of peripheral outer edge 12b. The step provides a gap 13 between the hub 12 and disk 14. As is described more fully below, gap 13 provides additional flexibility for vertical translation of hub 12 within cartridge 10.

Spindle motor 40 has several features that are adapted to interact with hub 12. In particular, spindle 40 includes the "z" datum 40a (provided by a raised ring), a round boss surface 40b and a conical lead-in groove 40c. All of these features cooperate to enable engagement and disengagement of hub 12 from spindle 40. In addition, the top of spindle 40 is magnetically sensitized to attract and magnetically couple hub 12 to spindle 40.

Significantly, hub 12 engagement and disengagement from spindle 40 occurs without translating the plane of cartridge 10 vertically (i.e. in the Z-axis direction) relative to the plane of the drive or without translating the spindle motor. Consequently, the height of drive 10 can be thinner than is possible in either a spindle or cartridge translation method. Instead of translating either the spindle or the cartridge, hub 12 and media 14 are translated along the Z-axis within shell 18 as the cartridge is translated linearly (i.e., along a plane substantially parallel to the X-axis) into and out of drive 50. No additional space is required within cartridge shell 18 to accommodate the Z-axis translation of hub 12, other than space which is already available to allow disk 14 to spin freely within shell 18. The present invention can even function properly with less interior cartridge space than that provided in a common 3.5 inch disk cartridge.

During insertion of cartridge 10 into drive 50, as depicted in FIG. 4A, hub 12 slides on inner ring surface 12c over the relatively planar profile of the bottom of chassis 57 and over the top of spindle 40. The ring surface provided by inner ring 12c provides a relatively large surface area for hub 12 to slide upon during insertion into drive 50. This large surface area ensures that the hub slides smoothly into drive 50. Downwardly projecting pin 20 is coupled proximate the center of cartridge 10 to top shell portion 18a. The downwardly projecting pin 20, engages sidewall 12a of hub 12 urging it into chassis 57.

A force applied to cartridge 10 during insertion causes pin 20 to push against the sidewall of bore 12a. This pushing provides a force to overcome the friction between inner ring surf ace 12c and chassis 57 and top of spindle 40. As cartridge 10 reaches far enough into drive 50, inner ring surface 12c aligns with conical lead-in groove 40c. At that point, the magnetic force provided by spindle 40 attracts and pulls hub 12 into engagement with spindle 40, resulting in inner ring surface 12c extending into conical lead-in groove 40c. As best shown in FIG. 4B, the angles of lead-in groove 40c and inner ring surface 12c, referably proximately 45 degrees, are such that hub 12 properly aligns on center with slindle 40 as hub 12 is pulled into a seated position. In particular, inner ring 12c forms a cone-like male surface that corresponds with the cone-like female opening of lead-in grove 40c. As the two cone-like surfaces engage, inner ring 12c is guided by conical lead-in groove 40c. Moreover, the relatively large diameter of inner ring surface 12c (as me sured across hub 12) and conical lead-in groove 40c ensures a highly accurate alignment of hub 12 to spindle 40.

As cartridge 10 ejects from drive 50, hub 12 disengages from spindle 40, again, without vertical translation of cartridge 10 with respect to drive 50 (only hub 12 and media 14 translate in the z-axis). As best shown in FIG. 4C, when cartridge 10 starts ejection from drive 50, cartridge shell 18 moves outwardly from drive 50. During this outward movement of cartridge shell 18, hub 12 initially remains seated on spindle 40. A force is required to cause disengagement of hub 12. The required force is provided by the movement of cartridge shell 18 relative to hub 12. Cartridge shell 18 has downwardly projecting pin 20 and rounded edge 18c that cooperate with hub 12 to facilitate disengagement.

Disengagement begins when pin 20 impinges on the sidewall of bore 12a. Substantially simultantously, rounded edge portion 18c contacts the angled peripheral outer edge 12b. As she 18 continues to move outwardly, rounded edge 18c slides against angled peripheral edge 12b. The horizontal movement (along the x-axis) of rounded edge 18c relative to angled edge peripheral edge 12b urges a lifting hub 12. The combined impingement of pin 20 and lifting of shell 18b cause hub 12 to tilt about datum 40a. As hub 12 tilts, inner ring surface 12c also tilts. When the bottom surface 12f of inner ring 12c clears the top 40d of spindle 40 hub 12 can also move begin moving outwardly with cartridge 10. As hub 12 moves outwardly, angled inner ring surface 12g engages angled spindle lead-in groove surface 40c. Because both surface are angled, hub 12 slides up the side of lead-in groove surface 40c.

Figure 4D:
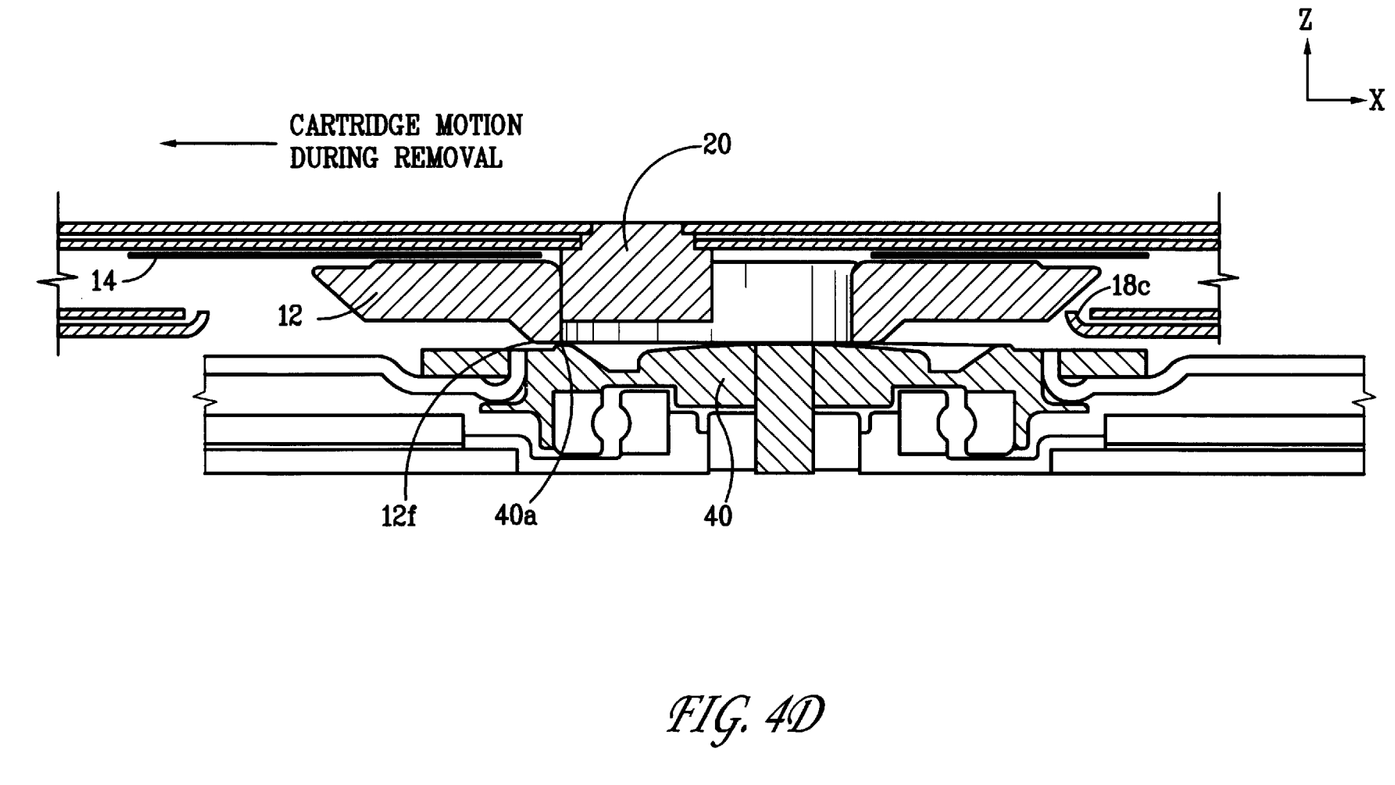

As best shown in FIG. 4D, when bottom surface 12f of innerzing 12c clear datum 40a of spindle 40, hub 12 is free to move with cartridge 10. Thereafter, pin 20 urges hub 12 to travel in tandem with cartridge shell 18. The force of pin 20 continues to drag hub 12 over the surface of spindle motor 53 and chassis 57 until cartridge 10 has ejected from drive 50.

The stepped profile of hub 12 allows for additional headroom as hub 12 tilts within cartridge 10. That is, without a stepped hub, the tilting could cause the top of hub 12 to impinge upon the inner top surface of shell 18a and interfere with the disengagement of hub 12 from spindle 40. Moreover, the stepped hub allows the disk 14 to flex as hub 12 is tilted during disengagement.

The above description of preferred embodiments is not intended to impliedly limit the scope of protection of the following claims. Thus, for example, except where they are expressly so limited, the following claims are not limited to applications involving tape drive systems.

What is claimed is:

1. A magnetic medium cartridge for use in a removable media disk drive having a spindle for coupling with said cartridge, said cartridge comprising:

an outer shell having a spindle access opening;

a substantially circular magnetic medium rotatably disposed within said outer shell; and a hub connected to said magnetic medium proximate the center of said medium, said hub having an angled peripheral edge which selectively engages an edge of said spindle access opening to tilt and decouple said hub from said spindle.

2. The magnetic medium cartridge as recited in claim 1 wherein said hub further comprises a center bore and wherein said cartridge further comprises a pin projecting down from a top of said outer shell and into said center bore, said pin selectively impinging upon said center bore enabling a decoupling of said hub from said spindle.

3. The magnetic medium cartridge as recited in claim 1 wherein said spindle access opening comprises a rounded edge adapted to selectively engage said peripheral edge of said hub.

4. The magnetic medium cartridge as recited in claim 1 wherein said hub comprises an inner ring surface adapted to engage said spindle.

5. The magnetic medium cartridge as recited in claim 1 wherein said hub comprises a ferrous material.

6. The magnetic medium cartridge as recited in claim 5 wherein said ferrous material comprises stainless steel.

7. A magnetic medium cartridge for use in a removable media disk drive having a spindle for coupling with said cartridge, said cartridge comprising:
   an outer shell having a spindle access opening;
   a substantially circular magnetic medium rotatably disposed within said outer shell; and
   a hub connected to said magnetic medium proximate the center of said medium, said hub having an edge that selectively engages an edge of said spindle access opening such that said hub tilts and decouples from said spindle when said cartridge ejects from said disk drive.

8. The magnetic medium cartridge as recited in claim 7 wherein said hub further comprises a center bore and wherein said cartridge further comprises a pin projecting down from a top of said outer shell and into said center bore, said pin selectively impinging upon said center bore enabling a decoupling of said hub from said spindle.

9. The magnetic medium cartridge as recited in claim 7 wherein said spindle access opening comprises a rounded edge adapted to selectively engage said edge of said hub.

10. The magnetic medium cartridge as recited in claim 7 wherein said edge of said hub comprises at least one outwardly projecting portion.

11. The magnetic medium cartridge as recited in claim 10 wherein said outwardly projecting portion comprises an angle along its outermost surface.

12. The magnetic medium cartridge as recited in claim 11 wherein said angle is about 45 degrees relative to a top plane of said hub.

13. The magnetic medium cartridge as recited in claim 7 wherein said edge of said hub comprises an outwardly projecting ring.

14. The magnetic medium cartridge as recited in claim 13 wherein said ring comprises an angled outward surface.

15. The magnetic medium cartridge as recited in claim 14 wherein an angle of said angled outer surface is about 45 degrees relative to a top plane of said hub.

16. The magnetic medium cartridge as recited in claim 7 wherein said hub comprises an inner ring surface adapted to engage said spindle.

17. The magnetic medium cartridge as recited in claim 7 wherein said hub comprises a ferrous material.

18. The magnetic medium cartridge as recited in claim 17 wherein said ferrous material comprises stainless steel.

19. A disk cartridge, comprising:
   an outer shell having a spindle access hole;
   a disk having a center hole, said disk being movably disposed within said outer shell; and
   a substantially annular hub having a top surface facing into the outer shell, a bottom surface facing away from said outer shell, said top surface having an upper annular shelf and a lower annular shelf, said lower annular shelf being radially outside said upper annular shelf and proximate a peripheral edge of said top surface forming a stepped top surface, said disk being attached to said hub on said upper annular shelf.

20. The disk cartridge as recited in claim 19 further comprising an outwardly projecting angular peripheral edge.

21. The disk cartridge as recited in claim 19 wherein said spindle access hole comprises a rounded edge adapted to selectively engage said angular peripheral edge.

22. The disk cartridge as recited in claim 19 wherein said hub comprises an inner ring surface adapted to engage a disk drive spindle.

23. The disk cartridge as recited in claim 19 wherein said hub comprises a ferrous material.

24. The disk cartridge as recited in claim 23 wherein said ferrous material comprises stainless steel.

25. A removable media disk drive for use with a removable media disk cartridge, comprising:
   a spindle comprising a substantially planar top surface;
   an annular groove disposed in said top surface of said spindle adapted to accept a ring surface of a media disk hub; and
   a fulcrum disposed outside of said annular groove on said top surface of said spindle causing said media disk hub to tilt during hub disengagement from said spindle while said disk cartridge is translated in a direction substantially parallel to said substantially planar top surface.

26. The removable media disk drive as recited in claim 25 wherein said fulcrum comprises an annular datum ring disposed on said top surface of said spindle.

27. A removable media disk drive as recited in claim 25 wherein said spindle is magnetically charged for attracting a ferrous disk hub.

28. A removable media disk drive as recited in claim 25 wherein said annular groove comprises angled side walls.

29. A removable media disk drive as recited in claim 28 wherein said angled side walls have an angle of about 45 degrees as measured from a top planar surface of said spindle.

30. A removable media disk drive system, comprising:
   a disk drive comprising:
      a spindle having a substantially planar top surface;
      an annular groove disposed in said top surface of said spindle adapted to accept a ring surface of a media disk hub;
      an annular datum ring disposed on said top surface of said spindle such that a fulcrum point is provided about which said media disk hub tilts during hub disengagement from said spindle;
   a cartridge comprising:
      an outer shell having a spindle access opening;
      a substantially circular magnetic medium rotatably disposed within said outer shell; and,
      a media disk hub connected to said magnetic medium proximate the center of said medium, said hub having an inner ring surface adapted to engage said spindle annular groove.

31. The removable media disk drive system as recited in claim 30 wherein said hub further comprises a peripheral edge that selectively engages an edge of said spindle access opening such that said hub decouples from said spindle when said cartridge ejects from said disk drive without translating said spindle or said outer shell relative to each other in a vertical direction.

32. The removable media disk drive system as recited in claim 31 wherein said peripheral edge comprises at least one outwardly projecting portion.

33. The removable media disk drive system as recited in claim 32 wherein said at least one outwardly projecting portion comprises an angle along its outermost surface.

34. The removable media disk drive system as recited in claim 33 wherein said angle is about 45 degrees relative to a top plane of said hub.

35. The removable media disk drive system as recited in claim 34 wherein said peripheral edge comprises an outwardly projecting ring.

36. The removable media disk drive system as recited in claim 35 wherein said ring comprises an angled outward surface.

37. The removable media disk drive system as recited in claim 36 wherein the angle of said outward surface is about 45 degrees relative to a top plane of said hub.

38. The removable media disk drive system as recited in claim 31 wherein said hub fisher comprises a center bore and wherein said cartridge further comprises a pin projecting down from a top of said outer shell and into said center bore, said pin selectively impinging upon said center bore enabling a decoupling of said hub from said spindle.

39. The removable media disk drive system as recited in claim 31 wherein said spindle access opening comprises a rounded edge adapted to selectively engage said edge of said hub.

40. A disk cartridge for use in a storage device, comprising:
   an outer shell;
   a substantially circular medium disposed within said outer shell, and
   a center disk coupled to said circular medium proximate an axis of rotation of said medium, said center disk comprising a top surface and a bottom spindle engagement surface, and an annular projection disposed inwardly from said bottom spindle engagement surface of said center disk, said annular projection comprising an angled radially outward facing surface.

41. The disk cartridge as recited in claim 40 wherein said center disk further comprises a center bore proximate the center of said center disk.

42. The disk cartridge as recited in claim 40 wherein said annular projection comprises an outer side wall, said outer side wall forming an obtuse angle with respect to the bottom surface of said center disk.

43. The disk cartridge as recited in any one of claims 40 or 42 wherein said annular projection comprises a substantially planar bottom surface.

44. The disk cartridge as recited in claim 40 wherein said center disk further comprises an angular peripheral edge.

45. The disk cartridge as recited in claim 44 wherein said angular peripheral edge forms an obtuse angle with respect to the top surface of said center disk.

46. The disk cartridge as recited in claim 40 wherein said center disk is attached to said medium at the top surface of said center disk.

47. The disk cartridge as recited in claim 40 wherein said annular projection is formed integrally with said center disk.

48. The disk cartridge as recited in claim 40 wherein said annular projection is attached to said center disk.

49. A disk cartridge for use in a disk drive having a spindle with an annular depression defined in a top surface thereof, said disk cartridge comprising:
   an outer shell having top and bottom surfaces with a driving access opening defined therein;
   a data storage medium rotatably disposed within said outer shell;
   a hub coupled to said data storage medium proximate an axis of rotation of said data storage medium and disposed within said driving access opening, said hub comprising a top surface and a bottom spindle engaging surface, said bottom spindle engaging surface of said hub having engagement means for engaging said annular depression of the spindle, said engagement means having an angled radially outward facing surface.

50. The disk cartridge as recited in claim 49 wherein said engagement means comprises an annular projection.

51. The disk cartridge as recited in claim 49 wherein said engagement means comprises at least one projection disposed on said hub such that said projection aligns with said annular depression when said cartridge is inserted into said drive.

52. The disk cartridge as recited in claim 49 wherein said engagement means comprises at least one projection formed on said hub, said at least one projection defined on said hub such that said at least one projection aligns annularly on said hub.

53. The disk cartridge as recited in claim 52 wherein said at least one projection comprises portions located at points along a ring.

54. The disk cartridge as recited in claim 49 wherein said angled radially outward facing surface comprises an angle of about 45 degrees with respect to the bottom spindle engaging surface of said hub.

55. The disk cartridge as recited in any one of claims 49, 50, 51, or 52 wherein said engagement means is formed integrally with said hub.

56. The disk cartridge as recited in any one of claim 49, 50, 51, or 52 wherein said engagement means is attached to said hub.

57. The disk cartridge as recited in claim 49 wherein said engagement means comprises a substantially planar bottom surface.

58. A disk cartridge for use in a disk drive, comprising:
   an outer shell having top and bottom surfaces with a driving access hole defined in the bottom surface thereof,
   a data storage medium rotatably disposed within said outer shell,
   a hub coupled to said data storage medium proximate the axis of rotation of said data storage medium;
   said hub having top and bottom surfaces and comprising a projection defined on said top surface, said projection being spaced from a radially outer edge of said top surface, said hub being attached to said medium by way of said projection.

59. The disk cartridge as recited in claim 58 wherein said projection comprises an annular projection.

60. The disk cartridge as recited in claim 59 wherein said projection has a substantially planar bottom surface.

61. The disk cartridge as recited in claim 59 wherein said projection comprises at least one substantially planar surface.

62. The disk cartridge as recited in claim 59 wherein said projection is formed integrally with said hub.

63. The disk cartridge as recited in claim 58 wherein said projection is attached to said hub.

\* \* \* \* \*